No. 686,204. Patented Nov. 5, 1901.
A. B. CLARK.
ROLLER FOR CASTERS.
(Application filed Mar. 29, 1900.)

(No Model.)

Witnesses:
M. D. Newman.
Saul Sippustein

Inventor:
Ambrose B. Clark
by his attys
Clarke & Raymond

UNITED STATES PATENT OFFICE.

AMBROSE B. CLARK, OF MERIDEN, CONNECTICUT, ASSIGNOR TO FOSTER, MERRIAM & COMPANY, OF MERIDEN, CONNECTICUT, A CORPORATION OF CONNECTICUT.

ROLLER FOR CASTERS.

SPECIFICATION forming part of Letters Patent No. 686,204, dated November 5, 1901.

Application filed March 29, 1900. Serial No. 10,608. (No model.)

*To all whom it may concern:*

Be it known that I, AMBROSE B. CLARK, a citizen of the United States, residing at Meriden, in the county of New Haven and State of Connecticut, have invented a new and useful Improvement in Rollers for Casters, of which the following is a full, clear, and exact description, reference being had to the accompanying drawings, forming a part of this specification, in explaining its nature.

The invention relates to the roller for casters herein shown and described.

Reference is had to the accompanying drawings, forming a part of this specification, in explaining the same, in which—

Figure 1:
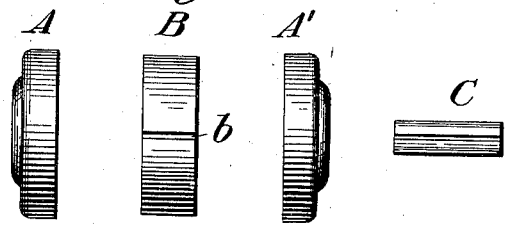
Figure 2:
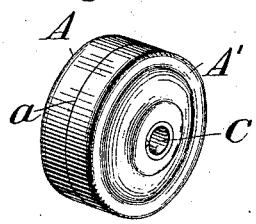
Figure 3:
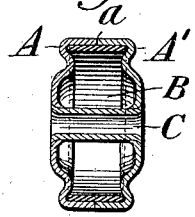

Figure 1 shows the four separate parts of my roller before they are assembled, Fig. 2 being a perspective view of the roller itself and Fig. 3 a diametrical section.

The roller, as shown, consists of two approximately cup-shaped pieces A A', which form a shell within which is a reinforce B. A tubular rivet C forms the axis of the roller, these parts being assembled, as will be understood from Fig. 3, the reinforce being set within one of the shells, the other shell being placed over it, so as to inclose it completely, the edges of the two shells being brought together, as at *a*, and the tubular rivet C being then passed through the central openings in the two pieces A A' and riveted into place, so as to form not only a rivet for the purpose of keeping the roller solid, but also a bearing through which a pin may be passed to attach the roller to the frame. The cup-shaped pieces A A' form a covering or shell for the reinforce, holding it in place and centering it with relation to the axis of the roller.

The reinforce B is preferably made in the form of a piece of slit tubing *b*, indicating the slit, which is parallel with the axis of the reinforce and which, in fact, enables the reinforce to be compressed slightly on putting it into place, the reinforce being preferably made slightly larger in diameter than the interior diameter of the pieces A A', so that it may be sprung into place, and thus form a tight and solid support for the shells. The tubular rivet may also be made in the form of a piece of slit tubing of proper diameter to enter the openings in the shells and of proper length to be riveted over the edge of such openings.

It will be seen that the reinforce will practically take the weight off from the cylindrical surface of the shell, and thus enable the shell to be made of comparatively light material, which may be struck up with very much less pressure than if the material were sufficiently strong to act in all respects as a caster-roller without any reinforce. This roller may be easily and cheaply made. The reinforce being normally slightly larger in diameter than the interior diameter of the shells will hold the shell together during the process of manufacture and until such time as the rivet is set therein. The advantage of this will be apparent. The reinforce is not only held from lateral movement by the side walls, but also is held from collapsing by the bending in of the side walls, which, however, are again bent out, as will be seen from Fig. 3, so that the points of engagement with the rivet are at a considerable distance apart, and a rivet may be used which is as long as or longer than the width of the periphery of the caster-roller.

It will be noticed that the structure provides a hub having a hollow bearing which is considerably wider than the tread and a tread which is reinforced by an integral cylindrical sleeve of practically its width, which is made from a piece of sheet metal bent to shape, so that its ends abut or very nearly abut, and which is held in the hollow structure against the inner surface of the tread by inward folds of the sides of the roll. This provides the roll with a long bearing at its center upon its holding pin or shaft, which is a desirable construction, while at the same time it has a sufficient floor-base.

It will be noticed that the sleeve which makes the bearing and the side piece are combined by means of countersunk recesses in the sides in which the ends of the sleeve are upset, so that they do not extend beyond the outer surfaces of the sides.

What I claim as my invention is—

The improved, hollow, sheet-metal, caster-roller herein described, the same comprising two sides, counterparts of each other, each struck from a flat sheet-metal blank to form a portion of a tread, a side having an inward extension within the tread and an outward extension beyond the outer edge of the tread forming the hub and in which is a hole extending from a central countersunk cup, which two counterparts are placed edge to edge and are combined by means of a reinforcing-sleeve of flat sheet metal bent to shape, of substantially the width of the tread, and bound under the abutting treads to bear against their inner surfaces by the said inward bends of the sides, and by a sleeve which forms a tubular central bearing and the ends of which are upset in the countersunk cups in the faces of the sides.

AMBROSE B. CLARK.

Witnesses:
 CHARLES N. FOSTER,
 JAMES R. SUTLIFF.